(12) United States Patent
Christiansen (10) Patent No.: US 11,255,744 B2
(45) Date of Patent: Feb. 22, 2022

(54) SYSTEM, TESTING ASSEMBLY AND METHOD FOR FATIGUE TESTING A WIND TURBINE BLADE

(71) Applicant: Siemens Gamesa Renewable Energy A/S, Brande (DK)

(72) Inventor: Soeren Christiansen, Stoevenring (DK)

(73) Assignee: SIEMENS GAMESA RENEWABLE ENERGY A/S

( * ) Notice: Subject to any disclaimer, the term of this patent is extended or adjusted under 35 U.S.C. 154(b) by 94 days.

(21) Appl. No.: 16/728,293

(22) Filed: Dec. 27, 2019

(65) Prior Publication Data

US 2020/0209100 A1 Jul. 2, 2020

(30) Foreign Application Priority Data

Jan. 2, 2019 (EP) .................................... 19150096

(51) Int. Cl.
*G01M 5/00* (2006.01)

(52) U.S. Cl.
CPC .......... *G01M 5/005* (2013.01); *G01M 5/0016* (2013.01)

(58) Field of Classification Search
CPC .... G01M 5/005; G01M 5/0016; G01M 13/00; F05B 2260/83; F03D 17/00; G01N 3/32
See application file for complete search history.

(56) References Cited

U.S. PATENT DOCUMENTS

| 2010/0263448 A1* | 10/2010 | Hughes | G01M 7/06 73/577 |
| 2011/0182730 A1* | 7/2011 | Link | F03D 1/0675 416/1 |
| 2015/0211496 A1 | 7/2015 | Frydendal | |
| 2016/0109325 A1 | 4/2016 | Lee et al. | |

(Continued)

FOREIGN PATENT DOCUMENTS

| CN | 106567803 A | 4/2017 |
| WO | 9932789 A1 | 7/1999 |

(Continued)

OTHER PUBLICATIONS

Zhang Z L et al: "Edgewise vibration control of wind turbine blades using roller and liquid dampers", Journal of Physics: Conference Series, Institute of Physics Publishing, Bristol, GB, vol. 524, No. 1, pp. 12037, XP020265711, ISSN: 1742-6596, DOI: 10.1088/1742-6596/524/1/012037 [retrieved on Jun. 16, 2014]; Abstract figure 1; 2014.

(Continued)

*Primary Examiner* — Suman K Nath
(74) *Attorney, Agent, or Firm* — Schmeiser, Olsen & Watts LLP (57) ABSTRACT

Provided is a system for fatigue testing a wind turbine blade including: a mounting for retaining a root end of the wind turbine blade, at least one actuator assembly for attachment to the wind turbine blade, the at least one actuator assembly including at least one actuator for exciting the wind turbine blade in flapwise directions and/or edgewise directions, and (Continued)

at least one measuring device for measuring of a stress, a strain and/or a deflection of the wind turbine blade. The system further includes at least one tuned liquid damper for attachment to the wind turbine blade, the tuned liquid damper comprising a container and a liquid contained therein.

10 Claims, 4 Drawing Sheets

(56) References Cited

U.S. PATENT DOCUMENTS

2017/0167959 A1* 6/2017 Schwind ............... G01L 1/26
2019/0154002 A1* 5/2019 Caponetti ............ F03D 7/0224

FOREIGN PATENT DOCUMENTS

| WO | 02084114 A1 | 10/2002 |
| WO | 2009097049 A2 | 8/2009 |
| WO | 2016060417 A1 | 4/2016 |

OTHER PUBLICATIONS

European Search Report and Written Opinion of the European Searching Authority dated Jul. 12, 2019 for Application No. 19150096.6.

Chinese Office Action for Application No. 202010001191.9, dated Jul. 20, 2021.

* cited by examiner

SYSTEM, TESTING ASSEMBLY AND METHOD FOR FATIGUE TESTING A WIND TURBINE BLADE

CROSS-REFERENCE TO RELATED APPLICATIONS

This application claims priority to EP Application No. 19150096.6, having a filing date of Jan. 2, 2019, the entire contents of which are hereby incorporated by reference.

FIELD OF TECHNOLOGY

The following is directed to a system for fatigue testing a wind turbine blade comprising: (a) a mounting for retaining a root end of the wind turbine blade, (b) at least one actuator assembly for attachment to the wind turbine blade, the at least one actuator assembly comprising at least one actuator for exciting the wind turbine blade in flapwise directions and/or edgewise directions, and (c) at least one measuring device for measuring of a stress, a strain and/or a deflection of the wind turbine blade. Moreover, embodiments of the present invention are directed to a testing assembly comprising the system according to embodiments of the invention and the wind turbine blade. Furthermore, embodiments of the present invention are directed to a method for fatigue testing the wind turbine blade with the testing assembly according to embodiments of the invention.

BACKGROUND

Wind turbine blades must be able to efficiently convert wind into spinning movement of the wind turbine blades, so that energy of the wind can be converted into rotary mechanical movement of a rotor to which the wind turbine blades are attached. In order for the wind turbine blades to provide a long service life and be operated in a safe manner, wind turbine blades must further be designed in a way that they are able to withstand inertial forces, aerodynamic forces and structural forces during operation. That is because every revolution of the wind turbine blades subjects the wind turbine blades to a fatigue cycle, with each of these fatigue cycles causing small amounts of damage. These damages eventually may lead to a fatigue crack or other failure of the wind turbine blades.

To determine service life of a wind turbine blade, there is an option to use modeling. However, modeling has its limitations, including inaccuracies between the model and the manufactured wind turbine blade and the difficulty of accurately modeling operational conditions with varying and randomly occurring loads. Moreover, regulations typically require that a batch of wind turbine blades of a production series are laboratory tested before they may be installed. As a result, wind turbine blades are typically laboratory tested to determine that their fatigue limit or characteristics are adequate for a requested service life.

Typically, wind turbine blades are fatigue tested in flapwise directions and in edgewise directions. The flapwise directions run transverse, in particular perpendicular, to a longitudinal axis of the wind turbine blade. The edgewise directions run transverse, in particular perpendicular, to the longitudinal axis of the wind turbine blade and transverse, in particular perpendicular, to the flapwise directions. When fatigue testing a wind turbine blade, the wind turbine blade is typically tested by applying loads to the wind turbine blade. The loads may be attached to the wind turbine blade at various positions along the wind turbine blade and arranged in various directions.

Presently, fatigue testing of wind turbine blades is performed in two different tests, a test in flapwise directions and a test in edgewise directions, for example. In each fatigue test, the loads are attached to the wind turbine blade in a specific location along the wind turbine blade to achieve a desired fatigue distribution along the wind turbine blade when exciting the wind turbine blade in flapwise directions or edgewise directions. Hence, the setup for the tests in the flapwise directions or the edgewise directions is not the same. The desired fatigue distribution for the flapwise directions or the edgewise directions is set to perform the fatigue test with fatigue cycles being as close as possible to the fatigue experienced by the wind turbine blades when in operation.

SUMMARY

However, there is still a problem to achieve laboratory fatigue distributions being as close as possible to real fatigue distributions. To achieve the desired fatigue distribution during excitation, typically loads are mounted along the blade to shape the moment distribution in flapwise or edgewise testing. However, the desired load placement for flapwise and edgewise testing are not the same. One test setup is used for flap, while another test setup is used for edge. In particular, it is important to fatigue test the wind turbine blade consistently along a sufficient length of the wind turbine blade and up to a target of maximum fatigue, which can be set by regulations, for example. For these reasons, it is not possible to simulate test fatigue cycles in flapwise directions and edgewise directions simultaneously in a single test while still delivering accurate results. The desired fatigue distribution in case of a combined test must be set for both, flapwise directions and edgewise directions, and thus can only be a compromise. For these reasons, a combined test would result in large overtesting. When a wind turbine blade is overtested, parts of the wind turbine blade are fatigue tested above a target of maximum fatigue. In this case, other parts of the wind turbine blade still need testing up to the target of maximum fatigue. However, the wind turbine blade can only be tested as a whole, even when changing the fatigue distribution. Thus, when testing parts of the wind turbine blade up to their target of maximum fatigue, overtested parts of the wind turbine blade will unavoidably be further fatigued above their target of maximum fatigue. Thus, there is a risk that the overtested parts of the wind turbine blade will break. This would make the fatigue test unsafe to perform and unexploitable for determining whether or not the wind turbine blade can be fatigue tested up to the target of maximum fatigue. However, running separate fatigue tests in the flapwise directions and the edgewise directions to avoid this problem is time consuming and expensive. However, even in separate fatigue tests in the flapwise or edgewise directions, some parts of the wind turbine blade will be overtested because it is not physically possible to achieve the target of maximum fatigue of all parts of the wind turbine blade at the same time. Some parts typically reach the target of maximum fatigue quickly and some targets take many more cycles to reach the target of maximum fatigue. Hence, there is a need for a wind turbine blade testing system that is less expensive to operate and requires less testing time to complete while still providing accurate fatigue testing results and prevents overtesting as much as possible.

According to a first aspect of embodiments of the invention, the problem is solved by a system for fatigue testing a wind turbine blade comprising: (a) a mounting for retaining a root end of the wind turbine blade, (b) at least one actuator assembly for attachment to the wind turbine blade, the at least one actuator assembly comprising at least one actuator for exciting the wind turbine blade in flapwise directions and/or edgewise directions, and (c) at least one measuring device for measuring of a stress, a strain and/or a deflection of the wind turbine blade. The system of embodiments of the invention is characterized in that the system further comprises at least one tuned liquid damper for attachment to the wind turbine blade, the tuned liquid damper comprising a container and a liquid contained therein.

In particular, the at least one tuned liquid damper is a device for attachment to the wind turbine blade to reduce the amplitude of mechanical excitations of the wind turbine blade. Especially, a natural frequency of the tuned liquid damper, in particular of the liquid contained in the container, is tuned to a resonance frequency of the wind turbine blade to be eliminated. At this resonance frequency, the wind turbine blade can only perform little excitations. In particular, the natural frequency of the tuned liquid damper is tuned to a resonance frequency of the wind turbine blade according to a movement of the wind turbine blade into flapwise directions or edgewise directions. The tuned liquid damper uses sloshing energy of the water to reduce the dynamic response of the wind turbine blade when the wind turbine blade is subjected to excitation. Tuned liquid dampers are cost effective, require little maintenance and are easily implementable. Moreover, tuned liquid dampers provide a lot of additional tuning parameters, such as an amount of contained liquid, a volumetric capacity of the container and a viscosity of the contained liquid, for example. By means of tuning at least one of the aforementioned tuning parameters, the natural frequency of the tuned liquid damper can be changed. Especially, the tuned liquid damper is attachable to an outside, in particular to a top side and/or a bottom side, of the wind turbine blade. The liquid may comprise, in particular predominantly, water, for example. The tuned liquid damper is reversibly attachable to the wind turbine blade. In particular, more than one tuned liquid damper can be used and attached spaced apart from one another to the wind turbine blade. If a container of sufficient mass and/or with sufficient liquid contained therein is provided, the tuned liquid damper can be used as a load for the wind turbine blade.

The at least one tuned liquid damper makes it possible to change the dynamical behavior of a wind turbine blade in flapwise directions or edgewise directions independently. Correlations between excitations in the flapwise directions and the edgewise directions can be cancelled entirely or at least largely. Hence, the accuracy of the fatigue test when running separate tests for flapwise directions and edgewise directions may be increased. Moreover, it is possible to perform an accurate single fatigue test which is testing the wind turbine blade in flapwise directions and edgewise directions simultaneously. The system of embodiments of the invention is thus less expensive to operate and the method of fatigue testing of embodiments of the invention requires less testing time to complete while still providing accurate fatigue testing results and effectively preventing overtesting.

The container of the tuned liquid damper may contain 10% to 90%, in particular 20% to 80%, liquid contained therein. The container of the tuned liquid damper may further have a static mass attached to it. The static mass may also be attached to the wind turbine blade in proximity of the container, especially within a distance of up to 1 meter from the container. It has been found, that the natural frequency of the tuned liquid damper can thereby be adjusted even further.

The at least one actuator may be any actuator capable of exciting the wind turbine blade. The actuator may be a motor, for example, an electric motor. The actuator assembly may comprise a frame attachable to the wind turbine blade. The frame may be a yoke. The actuator may be attached to the frame. Especially, the actuator assembly comprises at least two and in particular exactly two actuators. At least one actuator of the actuator assembly may be arranged on a top side of the frame while at least one other actuator of the actuator assembly may be arranged on a bottom side of the frame. The top side of the frame and the bottom side of the frame in particular correspond to the top side and the bottom side of the wind turbine blade, respectively. At least one actuator of the actuator assembly may be arranged in a flapwise direction, so that it excites the wind turbine blade in flapwise directions when operated. At least one other actuator of the actuator assembly may be arranged in an edgewise direction, so that it excites the wind turbine blade in edgewise directions when operated.

The at least one measuring device for measuring of a stress, a strain and/or a deflection of the wind turbine blade may be any measuring device capable of measuring a stress, a strain and/or a deflection of the wind turbine. In particular, at least one of the at least one measuring devices may be a strain gauge. Multiple strain gauges may be attached to the wind turbine blade. The strain gauges may be attached to the top side and/or the bottom side of the wind turbine blade. The strain gauges may be attached substantially perpendicular to the longitudinal axis of the wind turbine blade. Substantially means that a deviation of an exact perpendicularity of up to 30° in each direction is possible. The strain gauges can be connected to one another by at least one wire. In particular, multiple strain gauges are spaced apart from each other. The strain gauges can be connected by means of the at least one wire, for example, to an evaluation unit. The evaluation unit may be capable of analyzing a distribution of stress, strain and/or deflection in the wind turbine blade. At least one of the at least one measuring devices may be a camera capable of capturing deflections of the wind turbine blade. The camera may be additionally or alternatively connected to the evaluation unit.

In a further exemplary embodiment of the invention, the tuned liquid damper is arranged to automatically adjust a volume share of liquid in the container. In particular, the container can be designed to be automatically expandable and retractable, so that the volumetric capacity of the container can be adjusted. Thereby, the volume share of the liquid contained in the container can be adjusted without changing the amount of liquid therein. Alternatively, or additionally, the tuned liquid damper can be connected to a liquid reservoir via at least one connection means, such as a tube, for example. A pump may be arranged with the connection means and pump liquid into the container and out of the container automatically. By virtue of this feature, the tuned liquid damper can be tuned during a fatigue test, to change its natural frequency and thereby the fatigue distribution in the wind turbine blade. Thus, there is no need for pausing a fatigue test anymore or pauses in between the fatigue test can be significantly reduced, when the fatigue distribution shall be adjusted to enable uniform testing throughout the wind turbine blade and prevent overtesting, for example.

In another exemplary embodiment of the invention, the container contains at least one obstacle for limiting the movement of the liquid in the container. The at least one obstacle can be of any desirable shape, for example a rectangular shape or a spherical shape or combinations thereof. There are at least two obstacles in the tuned liquid damper, so that they influence each other and hereby provide a modification of the natural frequency of the tuned liquid damper. Thereby, a further tuning parameter is provided for the tuned liquid damper, that can moreover easily be adjusted.

In yet another exemplary embodiment of the invention, the system comprises at least one load for attachment to the wind turbine blade. If there are multiple loads, these loads may be attached to the wind turbine blade spaced apart from each other. In particular, each of these loads are attached at a distance of 2% to 30%, in particular at a distance of 5% to 20% of the length of the wind turbine blade from one another. These loads may comprise or be designed as yokes. In particular, the resonance frequency of these loads is not tuned to a resonance frequency of the wind turbine blade to be eliminated. Instead, the load is provided for applying a load to the wind turbine blade for fatigue testing.

According to a second aspect of embodiments of the invention, the problem is solved by a testing assembly comprising the system according to the first aspect of embodiments of the invention and the wind turbine blade, the root end of the wind turbine blade being retained in the mounting and the at least one actuator assembly and the at least one tuned liquid damper being attached to the wind turbine blade. Especially, the tuned liquid damper is attached to an outside, in particular to a top side and/or a bottom side, of the wind turbine blade. The tuned liquid damper is reversibly attached to the wind turbine blade. In particular, more than one tuned liquid damper are attached spaced apart from one another to the wind turbine blade.

In an exemplary embodiment of the invention, at least one of the at least one tuned liquid damper is attached to the wind turbine blade at the greatest width of the wind turbine blade or in an area starting from the greatest width of the wind turbine blade towards the tip end of the wind turbine blade. An attachment of the at least one tuned liquid damper is (a) at no distance or within a distance of less than 20%, in particular 10%, of a length of the wind turbine blade from a tip end of the wind turbine blade, and/or (b) at no distance or within a distance of less than 10%, in particular 5%, of the length of the wind turbine blade from a greatest width position of the wind turbine blade, at which the wind turbine blade has its greatest width. The length of the wind turbine blade is measured from the root end to the tip end along the longitudinal axis of the wind turbine blade. The length of the wind turbine blade is meant as the length of the tested wind turbine blade. For example, the tip end of the actual wind turbine blade may be cut off for fatigue testing. In such a case, the wind turbine blade length is the actually tested wind turbine blade length and not the initial wind turbine blade. It has been found that by attaching the tuned liquid damper close to or at the tip end, the root end and/or the greatest width position, it is possible to cancel correlations between excitations in the flapwise directions and the edgewise directions very sufficiently.

According to a third aspect of embodiments of the invention, the problem is solved by a method for fatigue testing the wind turbine blade with the testing assembly according to the second aspect of embodiments of the invention comprising the step of running a test cycle, the test cycle comprising the steps of: (a) exciting the wind turbine blade in flapwise directions and/or edgewise directions by means of operating the at least one actuator of the at least one actuator assembly, (b) measuring a stress, a strain and/or a deflection of the wind turbine blade by means of the at least one measuring device, and (c) analyzing a distribution of stress, strain and/or deflection within the wind turbine blade by means of an evaluation unit connected to the at least one measuring device. Multiple test cycles are run consecutively with pauses in between. In these pauses, the fatigue distribution along the wind turbine blade may be adjusted by repositioning the loads attached to the wind turbine blade, for example.

In an exemplary embodiment of the invention, the wind turbine blade is excited in flapwise directions and edgewise directions simultaneously. Thereby, the testing time of the fatigue test is improved significantly.

In a further exemplary embodiment of the invention, after running at least one test cycle and/or during a run of at least one test cycle, at least one tuning parameter of at least one of the at least one tuned liquid damper is adjusted. In particular, the at least one tuning parameter may be adjusted during a pause in between consecutive test cycles. Thereby, a very time-efficient testing method is provided, because the tuning parameter of tuned liquid damper can be adjusted very quickly, especially much quicker than changing the positions of loads attached to the wind turbine blade. The at least one tuning parameter can also be conveniently adjusting during a run of a test cycle. For example, this is possible when the tuned liquid damper can automatically adjust a volume share of liquid contained in the container. Thereby, a testing method that is even more time-efficient is provided, because pausing a test cycle is not necessary to adjust the fatigue distribution along the wind turbine blade.

In yet another exemplary embodiment of the invention, the at least one tuned tuning parameter of the tuned liquid damper is one of: an attachment position of the container on the wind turbine blade, a dimension of the container, a shape of the container, an orientation of the container, a volumetric capacity of the container, a viscosity of the liquid, and an amount or a shape of obstacle in the liquid. The orientation of the container in particular is an orientation in a flapwise direction or an edgewise direction. The different tuning parameters allow for a wide variety of fine-tuning capabilities of the tuned liquid damper.

BRIEF DESCRIPTION

Some of the embodiments will be described in detail, with reference to the following figures, wherein like designations denote like members, wherein.

DETAILED DESCRIPTION

Figure 1:
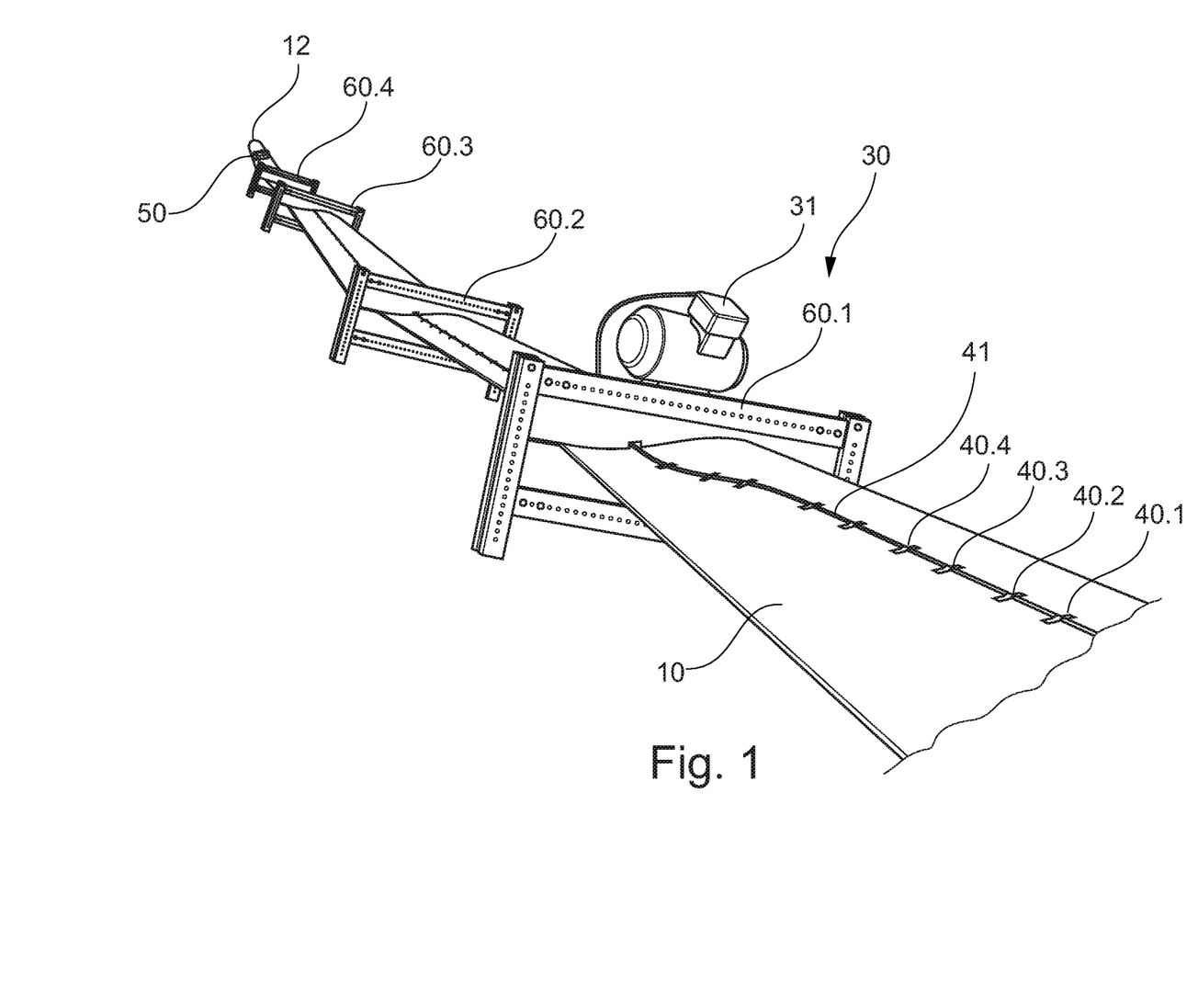
FIG. 1 shows a side perspective view on a first embodiment of a testing assembly according to the invention.

FIG. 1 shows an embodiment of the testing assembly according to a first embodiment of a testing assembly according to embodiments of the invention. The testing assembly comprises a wind turbine blade 10, of which a tip end 12 is shown but part of the wind turbine blade 10 close to a root end 11 as well as a mounting 20, in which the root end 11 is retained, are not shown in this figure. The testing assembly is mounted in the mounting 20 so that it is hanging.

Four loads 60.1, 60.2, 60.3, and 60.4 are attached to the wind turbine blade 10 spaced apart from each other. The loads 60.1, 60.2, 60.3, and 60.4 are designed as yokes in this embodiment. In particular, each of the yokes comprises four bars attached to one another to form a rectangular shape. Two holding plates are arranged in between the four bars. The holding plates are at one of their sides designed corresponding to the shape of the wind turbine blade 10 at the position of attachment of the yokes to the wind turbine blade 10. The loads 60.1, 60.2, 60.3, and 60.4 are all-round surrounding the wind turbine blade 10.

In this particular embodiment, an actuator assembly 30 is combined with the load 60.1. The load 60.1 is a frame of the actuator assembly 30 with an actuator 31 in a form of an electric motor being arranged on a top side of the load 60.1 and substantially perpendicular to a longitudinal axis A of the wind turbine blade 10 (shown in FIG. 2). The actuator 30 alternatively may be a hydraulic drive and/or a piston assembly or pushrod assembly exciting the wind turbine blade. The pushrod assembly may be arranged on a ground. The detailed operation of the actuator assembly 30 will later be explained with regard to FIG. 2.

Multiple measuring devices 40, of which measuring devices 40.1, 40.2, 40.3 and 40.4 are denominated, are arranged on a top side of the wind turbine blade 10. The measuring devices 40 are substantially perpendicular to the longitudinal axis A of the wind turbine blade 10 and spaced apart from each other along the wind turbine blade 10 in a direction of the longitudinal axis A. The multiple measuring devices 40 are connected with each other by means of a wire 41. The wire 41 may be connected to an evaluation unit, which is not shown.

Close to the tip end 12 of the wind turbine blade 10, a tuned liquid damper 50 is attached to the top side of the wind turbine blade 10. A natural frequency of the tuned liquid damper 50 is tuned to an edgewise resonance frequency of the wind turbine blade 10 to be eliminated. For example, a tuning parameter of an orientation of the tuned liquid damper 50 is tuned. That is, the tuned liquid damper 50 is attached to the wind turbine blade 10 in a direction perpendicular to the longitudinal axis A of the wind turbine blade 10. Thereby, the tuned liquid damper 50 reduces excitations in the edgewise directions when the wind turbine blade 10 is excited in the flapwise directions.

Figure 2:
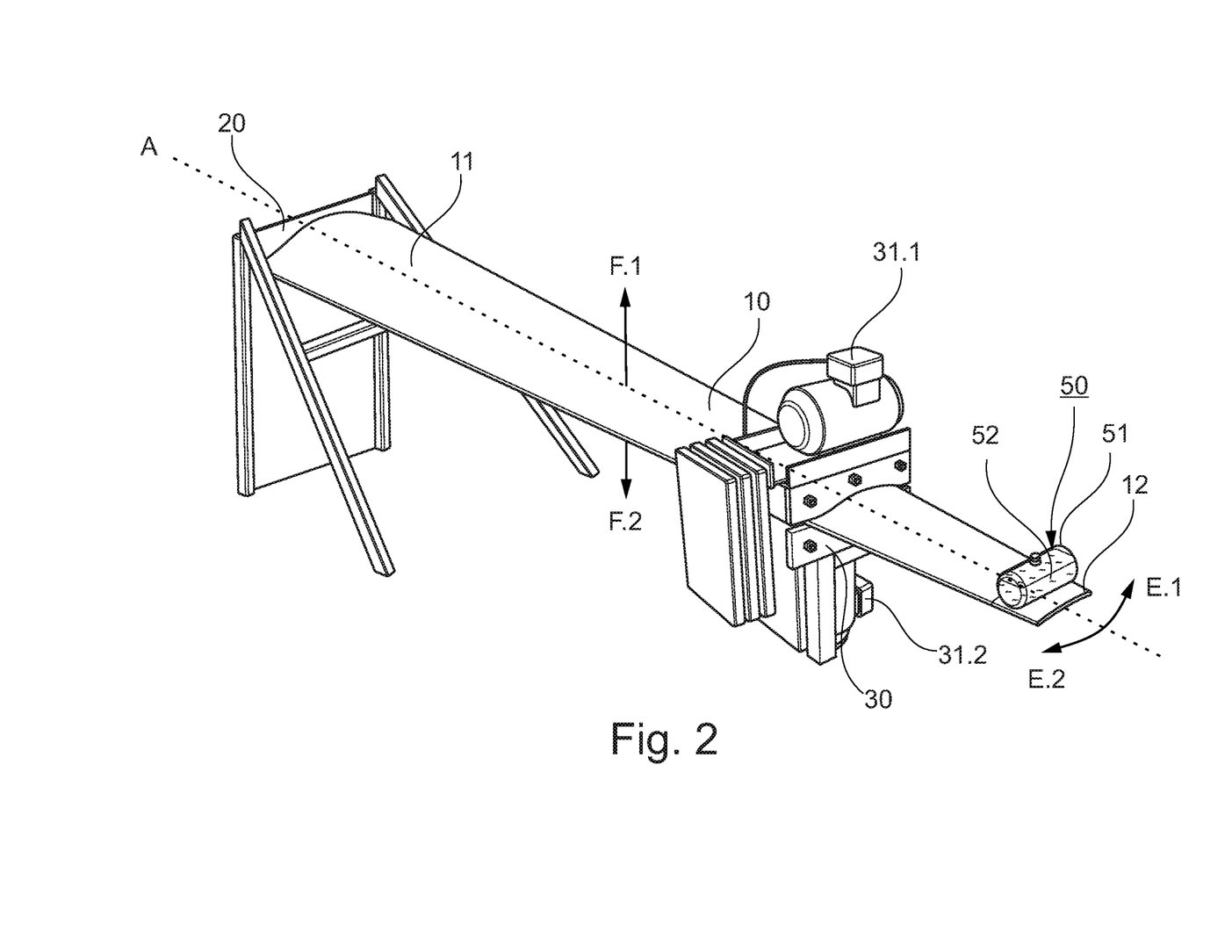
FIG. 2 shows a side perspective view on a second embodiment of a testing assembly according to the invention.

FIG. 2 shows an embodiment of the testing assembly according to a second embodiment of a testing assembly according to embodiments of the invention. This testing assembly with a relatively short wind turbine blade 10 of 5 meters length has been used for evaluating tuning parameters of the tuned liquid damper 50. For illustration purposes only, the measurement devices 40 and wire 41 have been omitted in FIG. 2.

The root end 11 of the wind turbine blade 10 being retained in the mounting 20 is shown in FIG. 2. Moreover, the longitudinal axis A of the wind turbine blade 10 is shown. Also, flapwise directions F.1 and F.2 and edgewise directions E.1 and E.2 of the wind turbine blade 10 are shown, into which the wind turbine blade 10 is moved, when the actuator assembly 30 with both its actuators 31.1 and 31.2 are being operated. Actuator 31.1 is arranged in the edgewise directions E.1 and E.2 and actuator 31.2 is arranged in the flapwise directions F.1 and F.2. Thereby, when operating the actuator 31.1, the wind turbine blade 10 is being moved in the edgewise directions E.1 and E.2. When operating the actuator 31.2, the wind turbine blade 10 is being moved in the flapwise directions F.1 and F.2.

A tuned liquid damper 50 is arranged at the tip end 12 of the wind turbine blade 10. The tuned liquid mass damper 50 comprises a container 51 and a liquid 52 contained therein. Water has been used as the liquid 52 in this particular embodiment. The volume share of the liquid 52 within the liquid mass damper 50 is 66% in this particular embodiment.

Figure 3A:
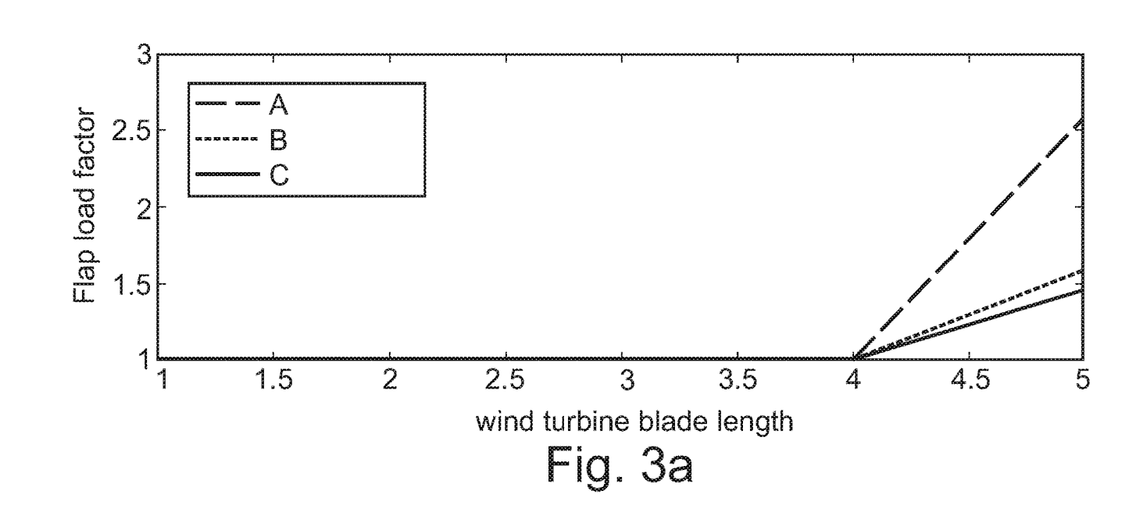
FIG. 3a shows a plot of flapwise deflection results from first fatigue tests with different tuned liquid dampers performed on the testing assembly of FIG. 2.
Figure 3B:
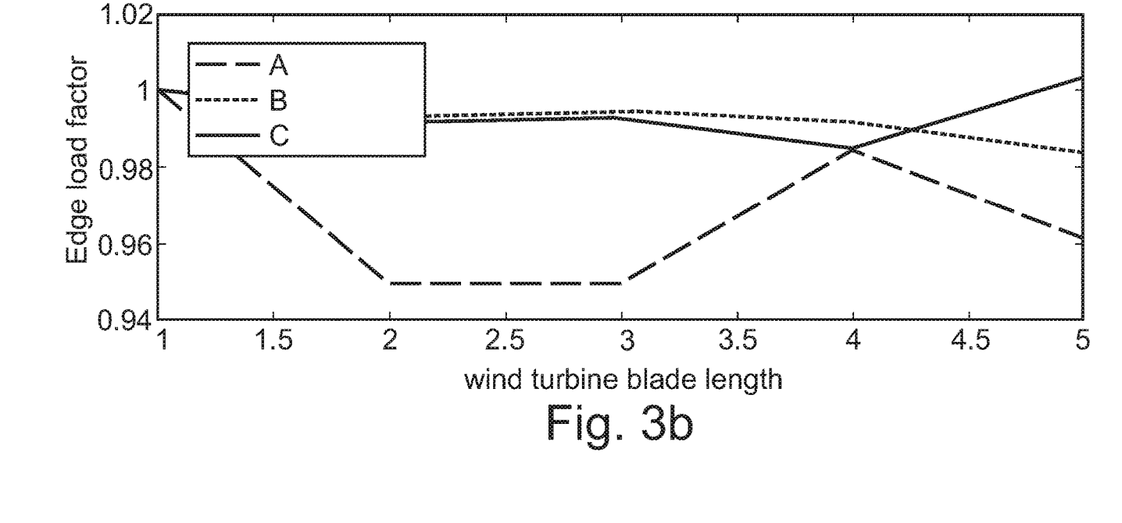
FIG. 3b shows a plot of edgewise deflection results from the first fatigue tests.

FIG. 3a and FIG. 3b show plots of flapwise and edgewise deflection results from first fatigue tests with different tuned liquid dampers 50 attached to the wind turbine blade 10 and performed on the testing assembly of FIG. 2. The flap load factor and the edge load factor on the axes of ordinates are normalized loads measured at specific wind turbine blade lengths in meters on the axes of abscissas. The normalized load factor of "1" relates to a fatigue test, where no tuned liquid damper 50 has been attached to the wind turbine blade 10. The flap load factor relates to a load in flapwise directions F.1 and F.2 and the edgewise load factor relates to a load in edgewise directions E.1 and E.2. The measurement devices 40 have been attached to the wind turbine blade 10 of the testing assembly at wind turbine blade lengths of 1 to 5 meters. Thus, the values on the axes of abscissas are in the range of 1 to 5.

The goal of the fatigue testing was to determine how far it is possible to increase flapwise loads without increasing edgewise loads using different types of tuned liquid dampers 50 and static masses, when operating the actuators 31.1 and 31.2 simultaneously to excite the wind turbine blade 10 in edgewise and flapwise directions. By increasing the flapwise loads without increasing edgewise loads, the fatigue distribution along the wind turbine blade 10 is changed so that the wind turbine blade 10 is tested primarily for flapwise loads.

The dashed line A relates to a fatigue tested setup A, where a container 51 with 66% volume share of the liquid 52 contained therein and a static mass of relatively little weight have been positioned near the tip end 12 of the wind turbine blade 10 of FIG. 2. To be precise, the liquid 52 was water. The volumetric capacity of the attached tuned liquid damper 51 was 0.5 liter. The weight of the static mass was 0.15 kg.

The dotted line B relates to a fatigue tested setup B, where a container 51 with 33% volume share of the liquid 52 contained therein has been positioned near the tip end 12 of the wind turbine blade 10 of FIG. 2. To be precise, the liquid 52 was water. The volumetric capacity of the attached tuned liquid damper 51 was 0.5 liter.

The continuous line C relates to a fatigued tested setup C, where only a static mass of relatively little weight has been positioned near the tip end 12 of the wind turbine blade 10 of FIG. 2. The weight of the static mass was 0.15 kg.

As can be taken from the fatigue test results plotted in FIG. 3a, the flap load factor was not influenced by any of the setups A, B or C at wind turbine blade lengths of 1 to 4 meters. However, the flap load factor has been influenced by the different setups A, B and C at wind turbine blade lengths of 4 to 5 meters. The flap load factor for each of the setups A, B and C follows a linear trend towards higher flap loads factors for higher wind turbine blade lengths in the range of 4 to 5 meters wind turbine blade length. In particular, the setup C shows the lowest flap load factor at any wind turbine blade length in the range of 4 to 5 meters and the greatest slope in the linear trend. Setup B shows a linear trend greater than but close to the one of setup C. Setup A, however, has the greatest slope of linear trend and highest flap load factors at any wind turbine blade length in the range of 4 to 5 meters. Thus, the flapwise loads have been increased in setup A the most, followed from setup B and setup C.

As can be taken from the fatigue test results plotted in FIG. 3b, the edge load factor was influenced by the different setups A, B and C throughout the entire measured wind turbine blade length. The setup A shows the highest decrease in edge load factor. Setups B and C show higher edge load factors along the entire wind turbine blade compared to setup A. Only the setup C shows an increase in edge load factor proximate to a wind turbine length of 5 meters.

In conclusion, the flap load factors and edge load factors have been less influenced by setups B and C than by setup A. The flap load increase in the setups B and C relates largely to the added weight at the tip end 12 of the wind turbine blade 10. However, the edge load factors have been barely influenced compared to the edge load factors measured with the setup A. Only in setup A, the natural frequency of the tuned liquid damper 50 was tuned to a resonance frequency of the wind turbine blade 10 corresponding to edgewise directions and has thus largely been eliminated. The setup C, which is basically setup A without the tuned liquid damper 50 of setup A, has not eliminated these frequencies throughout the entire wind turbine blade 10, especially not in such efficiency as done in setup A, but increased the edge load factor at the tip end 12 of the wind turbine blade 10 contrary to the goal of the fatigue test. Thus, it has been shown, that the tuned liquid damper 50 at the tip end 12 of the wind turbine blade 10 can increase flapwise loads while decreasing edgewise loads.

A second fatigue test has been performed on the testing assembly of FIG. 2, in which the setups of a tuned liquid damper and static mass attached to the tip end 12 of the wind turbine blade 10 and the amplitude of the operation of the actuators 31.1 and 31.2 have been changed. The results of this fatigue test are plotted in FIG. 4a and FIG. 4b in the same way as for FIG. 3a and FIG. 3b.

Figure 4A:
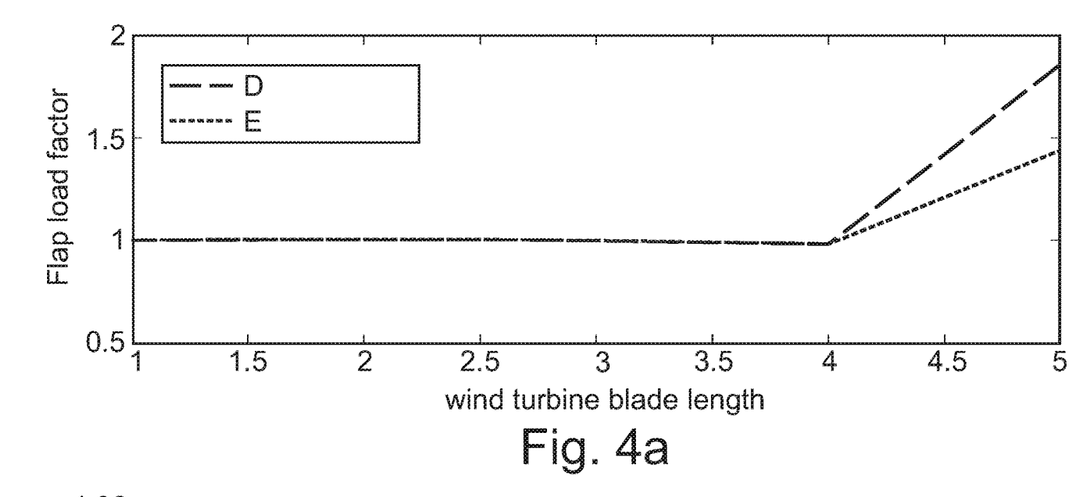
FIG. 4a shows a plot of flapwise deflection results from second fatigue tests with different tuned liquid dampers performed on the testing assembly of FIG. 2.
Figure 4B:
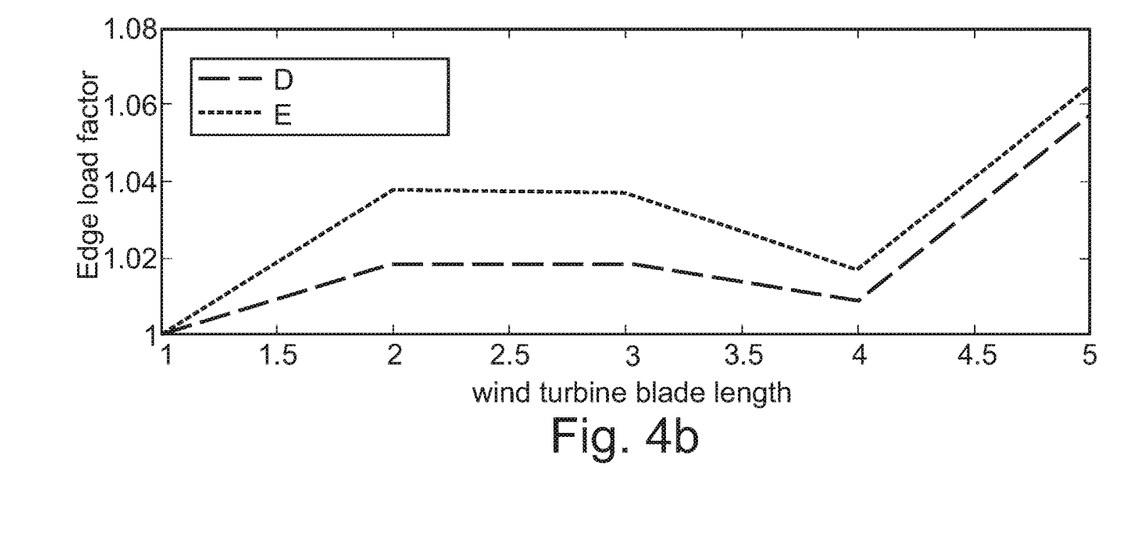
FIG. 4b shows a plot of edgewise deflection results from the second fatigue tests.

The dashed line D relates to a fatigue tested setup D, where a container 51 with 33% volume share of the liquid 52 contained therein and a static mass of relatively larger weight compared to the static mass of the first fatigue test have been positioned near the tip end 12 of the wind turbine blade 10 of FIG. 2. To be precise, the liquid 52 was water. The volumetric capacity of the attached tuned liquid damper 51 was 0.5 liter. The weight of the static mass was 0.45 kg.

The dotted line E relates to a fatigued tested setup E, where only the static mass of setup D has been positioned near the tip end 12 of the wind turbine blade 10 of FIG. 2. Hence, the weight of the static mass was 0.45 kg. Thus, the setups D and E are only different in the attachment of the tuned liquid damper 50 to the wind turbine blade 10 in setup D.

As can be taken from the fatigue test results plotted in FIG. 4a and FIG. 4b, the setup D has achieved higher flap load factors in the wind turbine blade length range of 4 to 5 meters. The edge load factors have not been decreased due to the heavier static mass compared to the first fatigue test. However, the edge load factors of setup D are lower than the edge load factors of setup E throughout the entire wind turbine blade 10. Thus, it can be followed, that the tuned liquid damper 50 can increase flapwise loads while decreasing edgewise loads for different amplitudes of the actuators 31.1 and 31.2.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A system for fatigue testing a wind turbine blade comprising:
   (a) a mounting for retaining a root end of the wind turbine blade,
   (b) at least one actuator assembly for attachment to the wind turbine blade, the at least one actuator assembly comprising at least one actuator for exciting the wind turbine blade in flapwise directions and/or edgewise directions, and
   (c) at least one measuring device for measuring of a stress, a strain and/or a deflection of the wind turbine blade, wherein
   (d) the system further comprises at least one tuned liquid damper for attachment to the wind turbine blade, the at least one tuned liquid damper being attachable to an outside of the wind turbine blade and comprising a container and a liquid contained therein.

2. The system according to claim 1, wherein the at least one tuned liquid damper is arranged to automatically adjust a volume share of the liquid in the container.

3. The system according to claim 2, wherein the container contains at least one obstacle for limiting movement of the liquid in the container.

4. The system according to claim 1, wherein the system comprises at least one load for attachment to the wind turbine blade.

5. A testing assembly comprising the system of claim 1 and the wind turbine blade, the root end of the wind turbine blade being retained in the mounting and the at least one actuator assembly and the at least one tuned liquid damper being attached to the wind turbine blade.

6. The testing assembly according to claim 5, wherein at least one of the at least one tuned liquid damper is attached to the wind turbine blade at a greatest width of the wind turbine blade or in an area starting from the greatest width of the wind turbine blade towards a tip end of the wind turbine blade.

7. A method for fatigue testing the wind turbine blade with the testing assembly of claim 5 comprising the step of running a test cycle, the test cycle comprising the steps of:
   (a) exciting the wind turbine blade in flapwise directions and/or edgewise directions by means of operating the at least one actuator of the at least one actuator assembly,
   (b) measuring the stress, the strain and/or the deflection of the wind turbine blade by means of the at least one measuring device, and
   (c) analyzing a distribution of the stress, the strain and/or the deflection in the wind turbine blade by means of an evaluation unit connected to the at least one measuring device.

8. The method according to claim 7, wherein the wind turbine blade is excited in the flapwise directions and the edgewise directions simultaneously.

9. The method according to claim 7, wherein after running at least one test cycle and/or during a run of at least one test cycle, at least one tuning parameter of at least one of the at least one tuned liquid damper is tuned.

10. The method according to claim 9, wherein the at least one tuned tuning parameter of the tuned liquid damper is one of: an attachment position of the container on the wind turbine blade, a dimension of the container, a shape of the container, an orientation of the container, a volumetric capacity of the container, a viscosity of the liquid, or an amount or a shape of an obstacle in the liquid.

* * * * *